United States Patent
Theiss

(10) Patent No.: US 10,088,015 B2
(45) Date of Patent: Oct. 2, 2018

(54) CHAIN LINK AND CIRCULAR CHAIN HAVING A CHAIN LINK

(71) Applicant: igus GmbH, Cologne (DE)

(72) Inventor: Georg Theiss, Cologne (DE)

(73) Assignee: IGUS GMBH, Cologne (DE)

( * ) Notice: Subject to any disclaimer, the term of this patent is extended or adjusted under 35 U.S.C. 154(b) by 0 days.

(21) Appl. No.: 15/548,161

(22) PCT Filed: Feb. 1, 2016

(86) PCT No.: PCT/EP2016/052063
§ 371 (c)(1),
(2) Date: Aug. 2, 2017

(87) PCT Pub. No.: WO2016/124540
PCT Pub. Date: Aug. 11, 2016

(65) Prior Publication Data
US 2018/0045276 A1 Feb. 15, 2018

(30) Foreign Application Priority Data
Feb. 2, 2015 (DE) .................... 20 2015 100 472 U

(51) Int. Cl.
*F16G 13/16* (2006.01)
*H02G 11/00* (2006.01)

(52) U.S. Cl.
CPC ........... *F16G 13/16* (2013.01); *H02G 11/006* (2013.01)

(58) Field of Classification Search
CPC .......... F16G 13/16; F16G 13/02; F16G 13/00; H02G 11/006
(Continued)

(56) References Cited

U.S. PATENT DOCUMENTS

| 1,901,789 A | * | 3/1933 | Wimberley | ............... F16B 7/04 49/325 |
| 2,172,525 A | * | 9/1939 | Surrows | ................... A44C 5/02 59/80 |

(Continued)

FOREIGN PATENT DOCUMENTS

| DE | 19916791 | 11/2000 |
| DE | 19957021 | 5/2001 |

(Continued)

OTHER PUBLICATIONS

English translation of International Search Report dated May 9, 2016, received in corresponding PCT Application No. PCT/EP2016/052063.

*Primary Examiner* — David B Jones
(74) *Attorney, Agent, or Firm* — Grossman, Tucker, Perreault & Pfleger, PLLC

(57) ABSTRACT

The invention relates to a chain link for a circular chain and to the circular chain for accommodating and guiding energy lines between two connections points that can be moved in relation to each other, in a circular motion about an axis of rotation (d). The circular chain has a circular-arc-shaped body having a circle center-point axis (k), which body is composed of a plurality of sector-shaped chain links adjoining each other in the circumferential direction, wherein the chain links are connected to each other in the adjoining connection regions thereof in such a way that, in each case, the chain links can be pivoted about a first pivot axis (s1) radial to the circle center-point axis (k). The chain link is designed to form a hinge-joint connection with the joint partner and has at least one connection region designed as a first connection region, which connection region is designed in such a way that the hinge-joint connection enables at least (Continued)

one further relative motion of the joint partners in addition to the pivoting about the first pivot axis (s1).

17 Claims, 8 Drawing Sheets

(58) Field of Classification Search
USPC .......................................................... 59/78.1
See application file for complete search history.

(56) References Cited

U.S. PATENT DOCUMENTS

| | | | | | |
|---|---|---|---|---|---|
| 2,729,935 | A | * | 1/1956 | Beck | B21L 9/04 |
| | | | | | 59/8 |
| 4,429,785 | A | * | 2/1984 | Dango | B65G 17/086 |
| | | | | | 198/852 |
| 4,807,432 | A | * | 2/1989 | Mauri | F16G 13/16 |
| | | | | | 248/49 |
| 6,387,002 | B1 | * | 5/2002 | Gunter | F16G 13/16 |
| | | | | | 474/206 |
| 7,367,447 | B1 | | 5/2008 | Harrison | |
| 7,434,382 | B2 | | 10/2008 | Iwami et al. | |
| 2011/0030330 | A1 | | 2/2011 | Komiya et al. | |

FOREIGN PATENT DOCUMENTS

| | | |
|---|---|---|
| DE | 102006029530 | 1/2007 |
| DE | 202010001084 | 4/2010 |
| EP | 0521506 | 1/1993 |
| FR | 1446085 | 9/1965 |
| GB | 1074804 | 7/1967 |

* cited by examiner

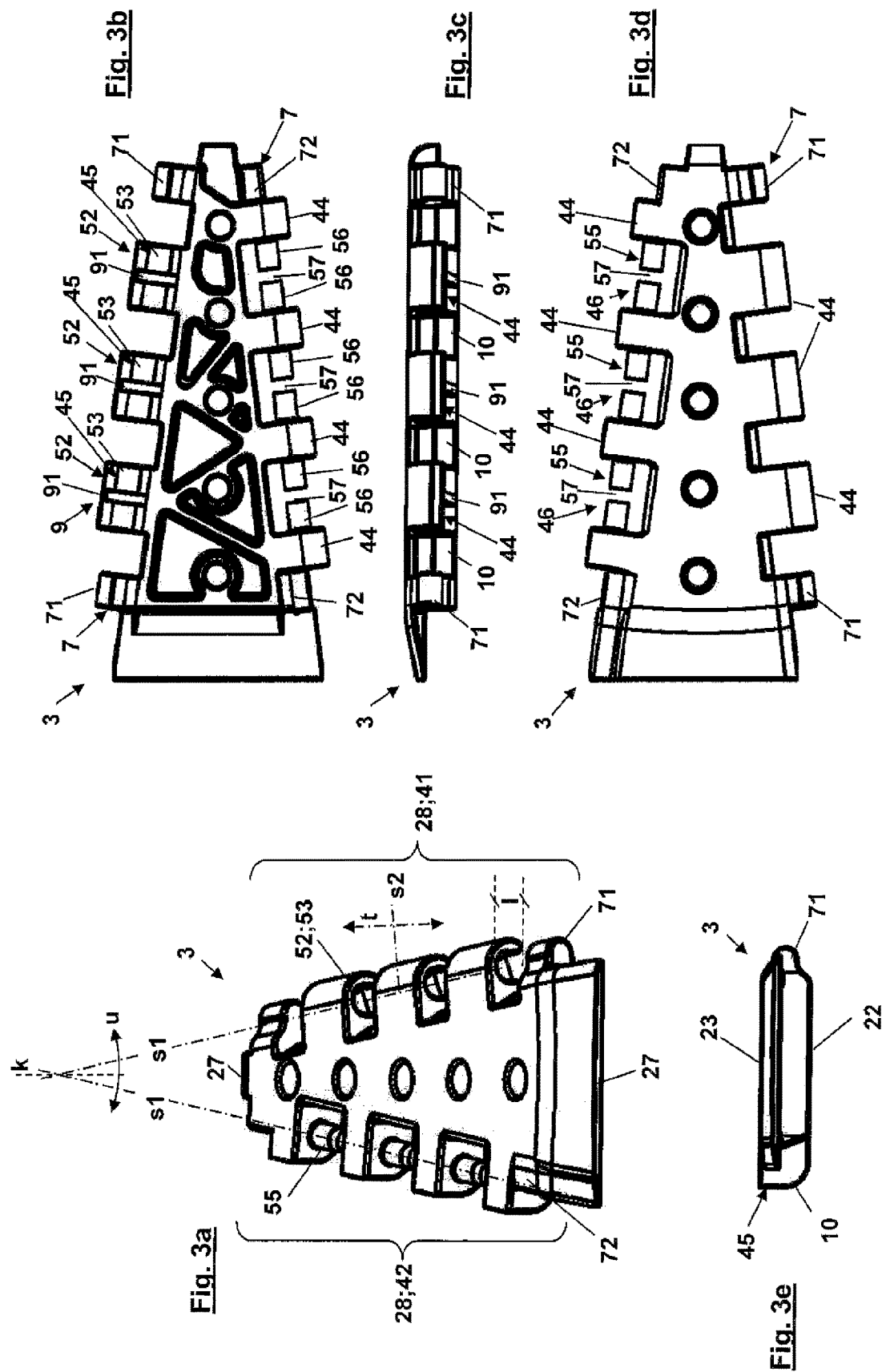

Fig. 6b
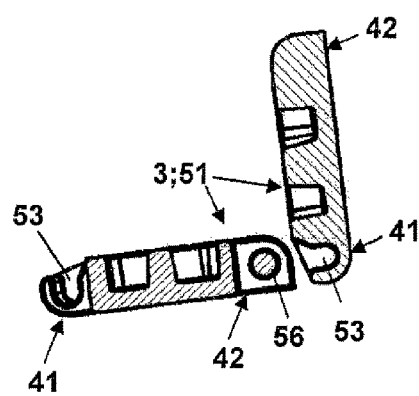
Fig. 9b
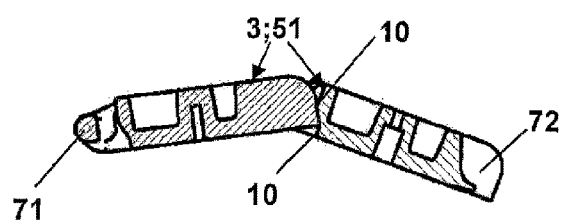
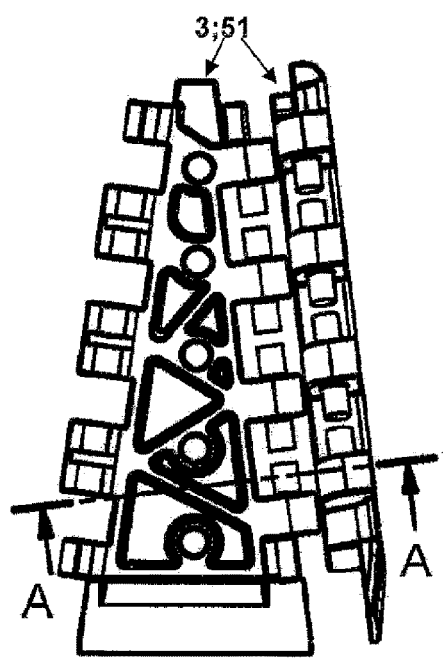
Fig. 6a
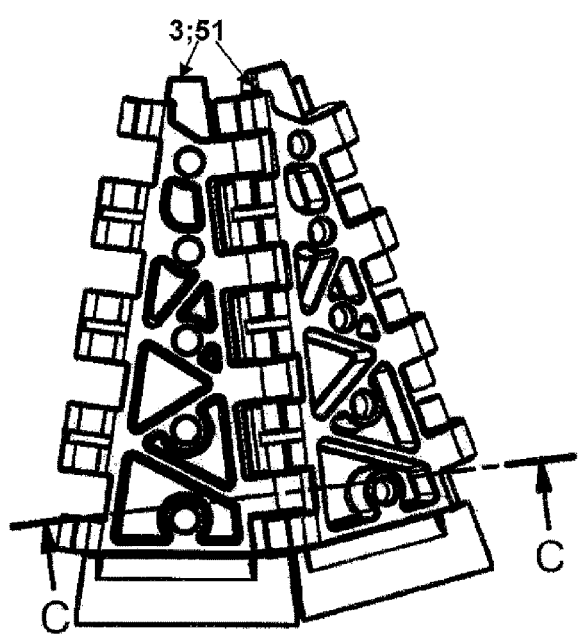
Fig. 9a

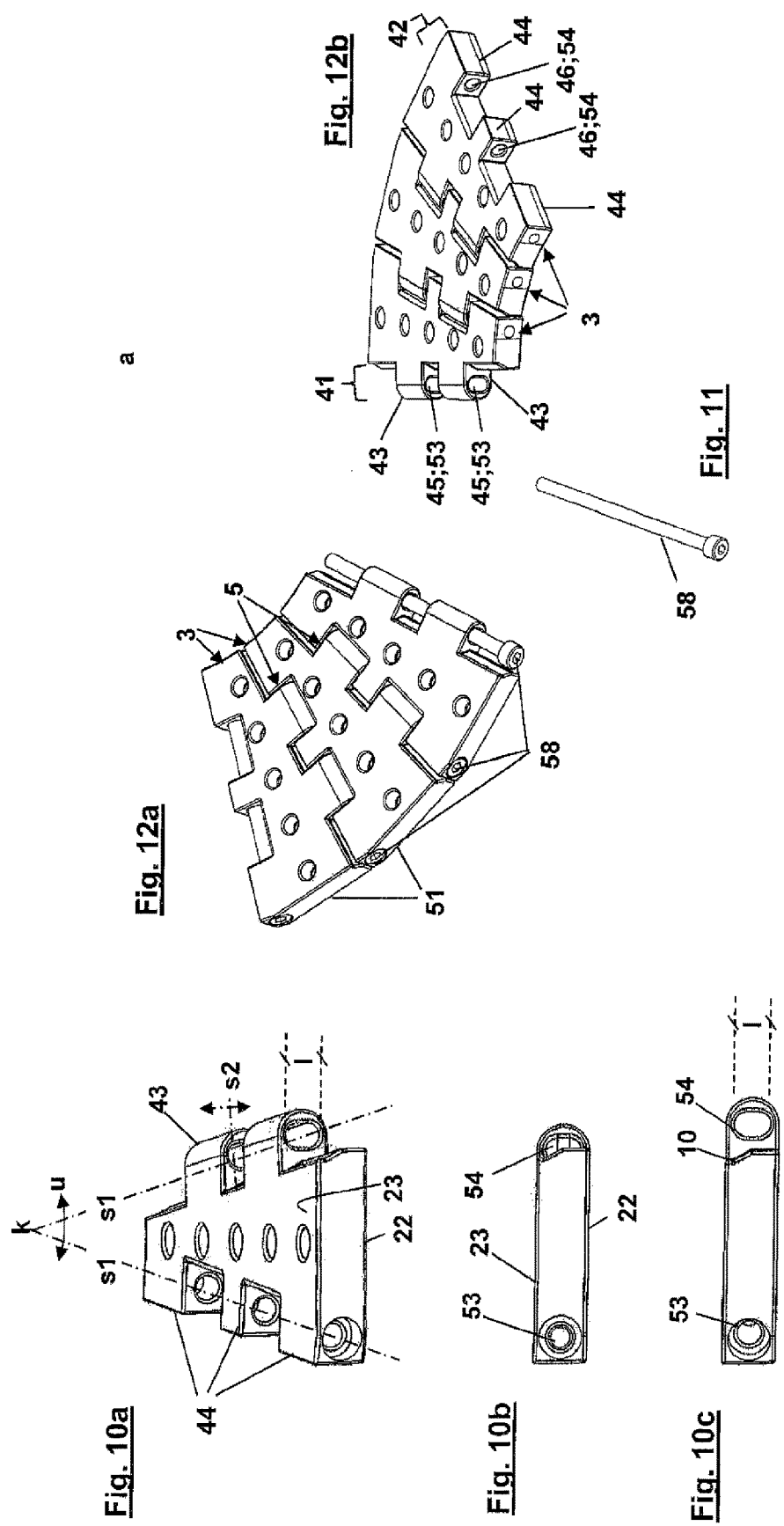

CHAIN LINK AND CIRCULAR CHAIN HAVING A CHAIN LINK

FIELD

The invention concerns a chain link for a circular chain for receiving and guiding energy lines between two connection points which are moveable relative to each other in a circular motion about an axis of rotation, wherein the circular chain has a circular arc-shaped body having a circle center point axis, which body is composed of a plurality of sector-shaped chain links adjoining each other in the peripheral direction, wherein in their adjoining connecting regions the chain links are connected together pivotably about a respective first pivot axis which is radial with respect to the circle center point axis. The invention further concerns a circular chain having such chain links.

BACKGROUND

Circular chains of that kind generally have two runs connected by way of a direction-changing arc. They are used for example in relation to industrial robots when lines have to be transmitted over large angles of rotation and at a high rotary angle speed. That requires correspondingly good and easy mobility of the body or the chain links making up the body.

A circular chain of the general kind set forth, comprising chain links of the general kind stated, is described in DE 20 2010 001084 U1, wherein the chain links are pivotably connected together by way of a radial first pivot axis. That already provides for good mobility.

SUMMARY

An object of the invention is to provide a chain link of the general kind set forth and a circular chain of the general kind set forth having a body of pivotably interconnected chain links, affording improved pivotal mobility relative to the joint partner.

According to the invention the specified object is attained by a chain link for a circular chain for receiving and guiding energy lines between two connection points which are moveable relative to each other in a circular motion about an axis of rotation (d), wherein the circular chain has a circular arc-shaped body having a circle center point axis (k), which body is composed of a plurality of sector-shaped chain links adjoining each other in the peripheral direction (u), wherein in their adjoining connecting regions the chain links are connected together pivotably about a respective first pivot axis (s1) which is radial with respect to the circle center point axis (k), wherein it is adapted to form a pivotal connection in the form of a hinge joint connection with the respective joint partner and has at least one connecting region which is in the form of a first connecting region and which is so adapted that in addition to the pivotal movement about the first pivot axis (s1) the hinge joint connection permits at least one further relative movement of the joint partners.The specified object is already attained in that the chain link is adapted to form a pivotal connection in the form of a hinge joint connection with the respective joint partner and has at least one connecting region which is in the form of a first connecting region and which is so adapted that in addition to the pivotal movement about the first pivot axis the hinge joint connection permits at least one further relative movement of the joint partner.

Therefore provided in the first connecting region are measures which permit a further relative movement of the joint partners and thus improved mobility thereof relative to each other. The chain link can be pivoted in a hinge connection with at least two degrees of freedom to the joint partners.

Preferably the first connecting region of the chain link is designed for a first additional relative movement of the joint partners in the form of a pivotal movement of the joint partners about a second pivot axis extending in the longitudinal direction of the circular chain. The second pivot axis can extend in a direction which is peripheral or approximately peripheral with respect to the circle center point axis, that is to say at least substantially in a peripheral direction, of the mutually adjoining sector-shaped chain links.

Alternatively or additionally the first connecting region of the chain link can be designed for a second additional relative movement of the joint partners in the form of a translation of the joint partners. The translation can occur in particular perpendicularly to the longitudinal direction and transverse direction of the chain link or the circular chain. Thus the translation movement can take place perpendicularly to the chain link plane. In regard to the pivot axes provided that translation movement can take place perpendicularly or approximately perpendicularly to the pivot axes, therefore at least substantially perpendicularly to the two pivot axes. Except for the region with the direction-changing arc therefore the translation movement can occur in the direction of the circle center point axis. The term translation of the one joint partner relative to the other joint partner is used to denote a displacement of the one joint partner relative to the other joint partner, in which all points of the one joint partner, that is to say the joint partner as a whole, are displaced relative to the other joint partner by an identical amount.

The hinge connection can have up to three degrees of freedom: pivotal movement about the first pivot axis, pivotal movement about the second pivot axis and translation perpendicularly to the pivot axes.

By means of the hinge connection it is possible to achieve excellent guidance for the joint partners in the pivotal movement thereof about the first pivot axis and with the additional degree of freedom increased mobility of the joint partners relative to each other. As explained hereinafter it is possible to overcome differences in height, in comparison with the circular chain of the general kind set forth, achieving tighter radii upon deflection of the circular chain around a direction-changing arc. In addition torsional forces stressing the circular chain can be avoided in particular by the pivotal movement about the second pivot axis.

The body of the circular chain with the chain links according to the invention can be for example in the basic shape of a flat belt in the shape of a circular ring, comprising hingedly interconnected chain links with one or more layers which are wound in helix-like fashion about a central axis in a readiness position. The body can thus serve as a support, a "spinal column", for the circular chain. The belt can have peripheral narrow sides and opposite larger sides connecting same, that is to say a first side and a second side. At least over a radial portion, the first side can be in the form of an at least substantially continuous sliding surface and/or can be arranged at the second side of the guide space.

If moreover the body in the position of use has a first run which is twisted or wound in the direction of rotation, a second run which is twisted or wound in opposite relationship to the first run, and a direction-changing arc connecting the two runs, increased relative mobility of the chain links is required in particular in the region of the direction-changing arc and the regions adjoining same of the runs, so that the joint partners do not impede each other in the course of that complex movement. An increase in the structural size of the belt, in particular an inside diameter of the belt, can provide a remedy to a certain extent, but does not change the basic problem. By virtue of the pivotal movement with at least an additional movement of the joint partners relative to each other they can more easily adapt to the movement in order to compensate for example for detrimental tolerances. In addition a tighter circular movement of the belt is possible. A reduction in the structural size is thus also possible.

Particularly in the region of the direction-changing arc torsional forces can occur in relation to the longitudinal axis, in which case the longitudinal axis of the circular chain in the readiness position extends in the peripheral direction of the belt with respect to the axis of rotation. Those torsional forces can detrimentally stress the belt and thus impede displacement of the body. An increased amount of wear is also to be reckoned with. By virtue of the additional second degree of freedom the joint partners can at least alleviate that stressing by virtue of their relative pivotal movement about the second pivot axis.

With the relative translation provided in respect of the joint partners in the form of a third degree of freedom of the hinge joint connection it is possible to overcome for example gradients in the direction of the axis of rotation involving steeper gradient angles, which without translation would also cause damaging stresses in the body, or would require a corresponding increase in the structural size, that is to say alleviation in respect of the gradient. That can be advantageous in regard to the above-described circular chain in which the runs are supported slidingly against each other at the regions adjoining the direction-changing arc, wherein due to the structure involved greater gradients occur in those regions in the direction of the axis of rotation.

Implementation of the translation movement can be afforded in a structurally simple fashion in that the first connecting region has a sliding guide means for guiding the associated joint partners. In that way the joint partners can be guided at or in the sliding guide means. Preferably the sliding guide means is designed for a purely linear translation movement of the joint partners relative to each other.

In a structurally uncomplicated fashion the first connecting region of the chain link as the first connecting means can have at least one first hinge opening which is axial with respect to the first pivot axis, with an uncurved, that is to say linear, slot profile as the sliding guide means. That provides that a translation relative movement of the joint partners can take place in the slot. That translation movement occurs in the longitudinal extent of the slot profile. The extent of the slot profile determines the direction of the translation. As it is uncurved the translation is purely linear. Preferably the slot profile extends in or at least substantially in the direction of the circle center point axis. The slot profile can be axially elongate perpendicularly to the first pivot axis with respect to the circle center point axis of the chain link. The circle center point axis can extend perpendicularly to a chain link plane.

The joint partner can engage into the slot in such a way that in addition or instead of the translation, tilting of the joint partner in the slot becomes possible. Tilting can be in the form of a pivotal movement about the second pivot axis. As it occurs due to the tipping movement in the slot, it is perpendicular to the first pivot axis. In both cases, the pivotal movement about the second pivot axis and the translation movement in the slot, the respective joint partner can abut at the end in the slot profile to delimit its relative movement.

The circular arc-shaped body of the circular chain can be of a circular ring-like configuration. Correspondingly the body of the chain link can be of a sector-shaped configuration, in particular in the shape of a sector of a circular ring. The chain link can have a plate-like body involving a thickness which is axial with respect to the circle center point axis, and has the two larger side surfaces, wherein in the position of installation in the circular chain they form a portion of the first side and the second side of the circular chain. The first hinge opening can be arranged centrally relative to the thickness. The longitudinal extent of the slot profile can be up to 95% of the thickness, in particular up to 90% of the thickness or about 85% of the thickness. The greater the proportion of the longitudinal extent in relation to thickness, the correspondingly greater is the possible mobility of the joint partners relative to each other.

The body of the chain link can be produced in one piece, in particular in the form of a plastic injection molding.

In a development of the chain link it can have a second connecting region spaced peripherally from the first connecting region with respect to the circle center point axis for providing the hinge joint connection with a further joint partner, more specifically at the first connecting region thereof, with the at least one first hinge opening. The second connecting region as the second connecting means can have at least one second hinge opening which is axial relative to the first pivot axis. That can be an at least substantially circular opening profile for receiving a hinge pin passed through the hinge openings of both joint partners.

Alternatively it is possible to provide in the second connecting region as a second connecting means, at least one substantially round pin for engagement into the first hinge opening of the associated joint partner. That pin can be formed in one piece on the chain link. In this embodiment therefore no further individual component part is required for the hinge connection. The connecting regions can each be arranged at the end or in an end region of the respective chain link.

In a development of the chain link the at least one first hinge opening with the opening C-shaped profile, for stabilization thereof in relation to radial enlargement with respect to the first pivot axis, can have a reinforcement means. That can be in the form of a reinforcement wall which is arranged perpendicularly relative to the first pivot axis and which is connected laterally to the C-shaped profile. Thus the reinforcement wall can receive from the C-shaped profile forces which are radial with respect to the first pivot axis. The reinforcement wall can advantageously centrally divide the first hinge opening perpendicularly to the first pivot axis.

Like the circular chain the sector-shaped body of the chain link can have a second side arranged perpendicularly to the circle center point axis. That side can be in the form of a carrier of the portion of the guide space that is associated with that chain link. It can delimit the guide space. It is possible to provide at the second side thereof means projecting axially with respect to the circle center point axis, in particular loop-shaped or arcuate holding means for receiving and guiding the energy lines. Preferably the C-shaped profile is of an opened configuration axially with respect to the circle center point axis in the direction of the surface normal facing away from the second side, or in the direction of the projecting means. Particularly when at least each third or fourth chain link of the circular chain has such holding means they can limit the pivotal movement of the chain links about the first pivot axis, by butting at the end laterally against each other. In that way, as described in greater detail hereinafter, in particular during storage and assembly of the circular chain, it is possible to prevent a chain link connected by way of the hinge connection sliding out of the C-shaped profile.

The holding means can form an integral component together with the body. Preferably however the holding means can be subsequently fixed to the body. In that case the holding means can structurally vary depending on the respective demands involved as in configuration and/or dimensioning. Admittedly but not necessarily each of the chain links in the circular chain can have the holding means. Preferably the chain links provided with holding means are arranged spaced equally over the circular chain length.

In a further development of the chain link it can be provided that, extending peripherally or tangentially away from the respective circle center point axis, arranged in the first connecting region is at least a first projection with the first connecting means and arranged in the second connecting region is at least a second projection with the second connecting means. For improved mechanical stability of the hinge connection and for better guidance of the two joint partners relative to each other, it is possible to provide a plurality of first and second projections. In that case the number of first projections provided in the first connecting region can be smaller by one than the second projections in the second connecting region. The consequence of this is that in the installation position a first projection is axially flanked by two respective second projections.

In the installation position first hinge openings and second hinge openings or pins can be arranged in axially mutually aligned relationship with respect to the pivot axis. For easier pivotal movement of the chain links of the circular chain the projections can preferably be of a rounded configuration at their respective ends about the first pivot axis. In an embodiment of the chain link at least two projections in the form of first projections can be provided in the first connecting region and at least three projections in the form of second projections can be provided in the second connecting region. The projections can be arranged in radially mutually adjoining relationship and in an alternate sequence with respect to the circle center point axis. The projections of adjacent chain links can engage tooth-like into each other in the connecting position, wherein the hinge openings of the projections are arranged in axially aligned relationship with respect to the first pivot axis. The projections can be in axially non-displaceable lateral contact with respect to the first pivot axis.

For the situation where the second connecting means has at least one at least substantially round pin for engagement into the first hinge opening of the associated joint partner the pin can extend in the direction of the second pivot axis between two second projections. For the situation where the first hinge opening with the opening C-shaped profile for stabilization thereof in relation to radial enlargement with respect to the first pivot axis has a reinforcement wall arranged perpendicularly to the first pivot axis, the pin can be divided in the region of the reinforcement wall into two pin portions which respectively extend axially towards each other with a free end with respect to the first pivot axis to define an intermediate space for engagement of the reinforcement wall. The intermediate space can be of an axial size equal to the thickness of the reinforcement wall.

There can be provided a circular chain according to one of the embodiments described hereinbefore and hereinafter for receiving and guiding energy lines between two connection points moveable relative to each other in a circular movement about an axis of rotation. The circular chain can have a guide space for the energy lines and a sector-shaped body which is composed of a plurality of sector-shaped chain links in accordance with one of the embodiments described hereinbefore and hereinafter, in mutually adjoining relationship in the peripheral direction. The chain links can be connected together pivotably in mutually adjoining relationship in connecting regions in a respective hinge joint connection by way of a radial first pivot axis.

The hinge joint connection can have a further degree of freedom in the form of an additional relative movement of the joint partners. The additional relative movement can be in the form of a pivotal movement of the joint partners about a second pivot axis in a peripheral or tangential direction with respect to the axis of rotation, and/or in the form of a translation which is at least substantially axial relative to the axis of rotation, perpendicularly or approximately perpendicularly to the pivot axes.

As described hereinbefore adjacent chain links are respectively connected together by way of a first connecting region of the one joint partner and a second connecting region of the other joint partner. In a development of the circular chain the first connecting means of the chain links in the readiness position of the circular chain can have at least one first hinge opening which is radial with respect to the axis of rotation, with an at least substantially axially extending slot profile with respect to the axis of rotation, and the second connecting means can have at least one second hinge opening which is at least substantially radial with respect to the axis of rotation and which has a circular opening profile. In the hinge connection the hinge openings are arranged in axially aligned relationship with respect to the first pivot axis and are held pivotably moveably relative to each other by means of a hinge pin passed through the hinge openings.

Alternatively the first connecting means in the readiness position of the circular chain can have at least one first hinge opening which is radial with respect to the axis of rotation and has a slot profile which extends at least substantially axially with respect to the axis of rotation and which is in the form of a C-shaped profile opened in the axial direction. The second connecting means can have at least one pin which is arranged at least substantially radially with respect to the axis of rotation and which engages through the first hinge opening in the connecting position.

To connect two joint partners the first and second connecting means of the associated connecting regions of two joint partners in a joining position in which the joint partners are set at an angle around 90° can be moved above each other and brought into engagement with lateral engagement of the pin into the C-shaped profile of the first hinge opening. Then the two joint partners at the connecting means can be pivoted out of the joining position into a working position in which the joint partners are at an angle around 180°. The joint partners can be secured to prevent disengagement of the connection in the working position, in the joining position.

BRIEF DESCRIPTION OF THE DRAWINGS

Without limiting the present invention thereto it is described in greater detail hereinafter by means of a number of embodiments illustrated in a drawing of the chain link and the circular chain with chain links:

FIGS. 3a through 3e each show a view of a chain link of the circular chain of FIG. 1, but without holding means provided;

FIGS. 6 through 8 respectively show a perspective view and sections illustrating assembly of two chain links as shown in FIG. 4 in three steps;

FIGS. 9a and 9b show a perspective view of two assembled chain links and a sectional view thereof in their relative position in the direction-changing arc of the circular chain;

FIGS. 10a through 10c each show a view of a second embodiment of the chain link;

FIG. 11 shows a perspective view of a hinge pin;

FIGS. 12a and 12b each show a perspective view of three assembled chain links as shown in FIG. 10.

DETAILED DESCRIPTION

Figure 1B:
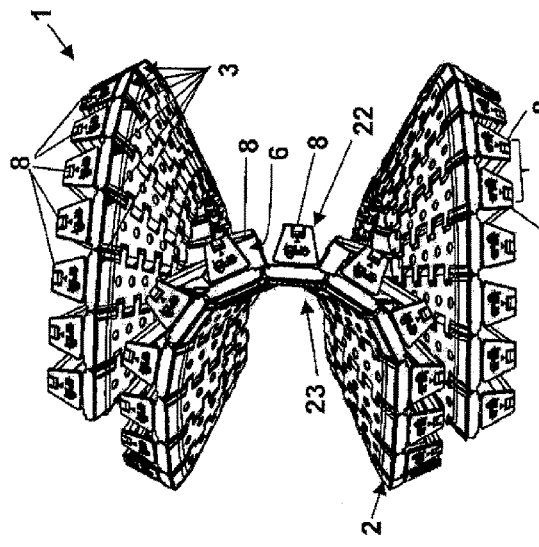
FIGS. 1a through 1d each show a view of a first embodiment of a circular chain comprising a row of chain links according to a first embodiment with possible connections and connecting members omitted.
Figure 1D:
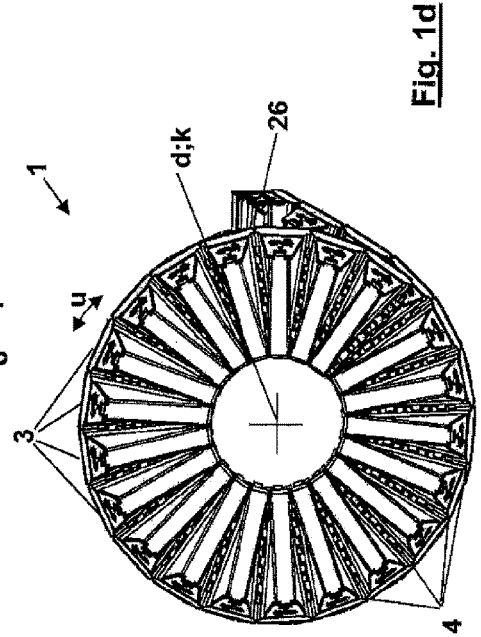
Figure 1A:
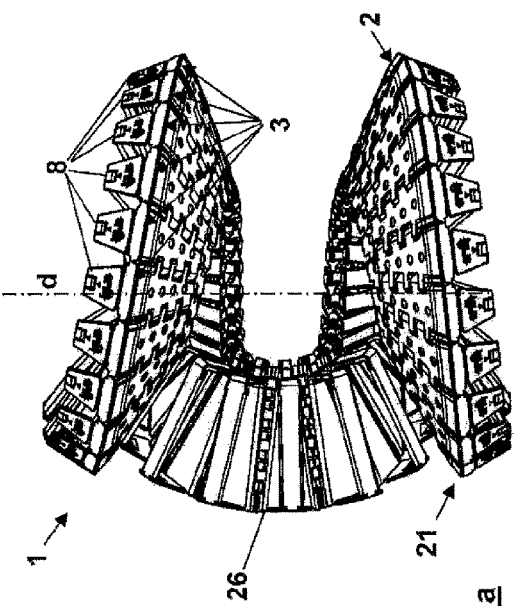
Figure 1C:
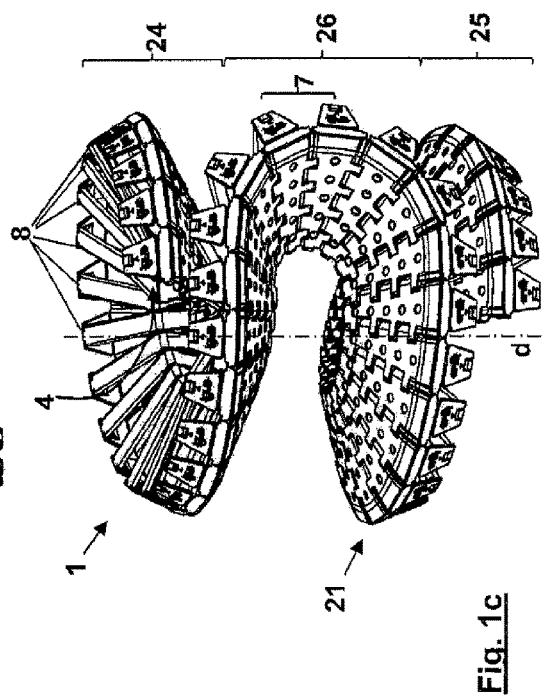

FIGS. 1a through 1d show a circular chain 1 for receiving and guiding energy lines (not shown here) between two connection points (not shown here) which are moveable relative to each other, in a circular movement about an axis of rotation d. The circular chain 1 has a circular arc-shaped body 2 with a circle center point axis k (FIGS. 1d and 3a), which body is composed of a plurality of sector-shaped chain links 3 adjoining each other in the peripheral direction u. In their adjoining connecting regions 41, 42 the chain links 3 are connected pivotably to each other by way of a pivot connection in the form of a hinge joint connection 5 about a first pivot axis s1 which is radial with respect to the circle center point axis k. As can be seen for example from FIG. 3a, a perspective view of a first embodiment of a chain link 3, a connecting region in the form of a first connecting region 41 is so designed that the hinge joint connection 5, in addition to the usual pivotal movement about the first pivot axis s1, here permits two further relative movements of the joint partners 51, that is to say the hingedly interconnected chain links 3.

The first additional relative movement of the joint partners 51 is a pivotal movement of the joint partners 51 about a second pivot axis s2 in a direction u peripheral relative to the circle center point axis k. Here, the second additional relative movement of the joint partners 51 is a translation of the joint partners 51 in a translation direction t perpendicular or approximately perpendicular to the pivot axes s1, s2. As can be seen from the Figures the translation takes place perpendicularly to the longitudinal direction l and the transverse direction q of the chain link 3 or the circular chain 1. Here therefore the hinge joint connection 5 has three degrees of freedom, a pivotal movement about the first pivot axis s1, a pivotal movement about the second pivot axis s2 and a translation movement in the translation direction t. The joint partners 51 of the hinge joint connection 5 are arranged in axially non-displaceable relationship with each other with respect to the first pivot axis s1.

In a readiness position (not shown here), the body 2 of the circular chain 1, as its basic shape, has a flat circular belt 21 comprising hingedly interconnected chain links 3 with one or more layers wound helically around a central axis. The belt 21 has two mutually opposite larger sides perpendicularly to the axis of rotation d, that is to say a first side 22 and a second side 23, the second side 23 being the carrier for a guide space 6 for the energy lines. In the position of use shown in FIG. 1 of the circular chain 1 the body 2 is passed back over itself in such a way that it has a first run which is wound or twisted in the direction of rotation, a second run 25 which is wound in the opposite direction to the first run 24 and a direction-changing arc 26 connecting the two runs 24, 25, the first side 22 being arranged inwardly in the direction-changing arc 26. Just from looking at them it will be apparent from the views in FIG. 1 that the movement of the body 2 through the direction-changing arc 26 is highly complex with a continuous change in the positioning of the individual chain links 3. That easily results in torsional and/or flexural stresses, that can be countered by the additional relative movements of the chain links relative to each other.

The chain links 3 like the belt 21 each have a body 2 having a first side 22 and a second side 23, wherein the two sides 22, 23 are connected together by narrow sides 27 which are peripheral with respect to the circle center point axis k and radial narrow sides 28. In that case the connecting regions 4 of the chain links 3 are respectively arranged at the radial narrow sides 28, at which the joint partners 51 are connected in the hinge joint connection 5. The chain links each have a first connecting region 41 and a second connecting region 42, wherein to provide the hinge connection 5 the first connecting region 41 of the one joint partner 51 is connected to the second connecting region 42 of the other joint partner 51.

Provided in the first connecting region 41 are first projections 43 which extend tangentially away from the circle center point axis k and have first connecting means 45 while provided in the second connecting region 42 are second projections 44 extending tangentially away from the circle center point axis k and having second connecting means 46. The projections 43, 44 of the joint partners 51 engage tooth-like into each other in alternate sequence. In the embodiments shown here of the chain links 3 there are four second projections 44 and three first projections 43, wherein a first projection 43 is respectively flanked by two second projections 44 and bears in axially non-displaceable relationship against same with respect to the first pivot axis s1.

Provided at the first projections 43 as the first connecting means 45 is a respective sliding guide means 52 forming a first hinge opening 53, the first hinge opening 53 extending axially in the direction of the pivot axis s1 associated therewith. The sliding guide means 52 has a slot profile extending over a length l in the direction of the circle center point axis k. In the first embodiment of the chain link 3 as shown in FIGS. 4 through 9 that slot profile is of an opened configuration in the direction of the surface normal of the second side 23, providing a C-shaped profile, wherein the limbs of the C-shaped profile extend parallel and in the direction of the circle center point axis k. Provided laterally between the second projections 44 as second connecting means 46 are pins 55 which engage into the first hinge opening 53 of the joint partner 51 to provide the hinge joint connection 5. In a neutral position in which the sides 22, 23 of the joint partners 51 are in mutual alignment the pin 51 is arranged at half the height of the length l of the slot profile in the first hinge opening 53.

Figure 8C:
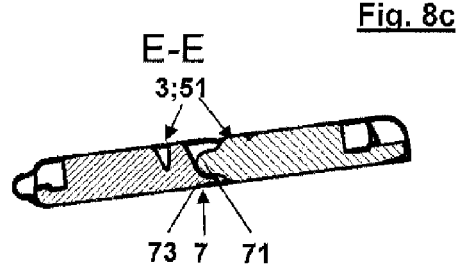
Figure 7B:
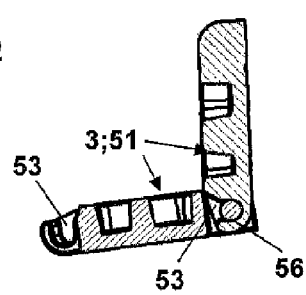
Figure 8B:
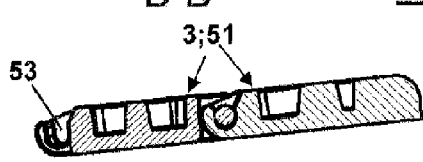
Figure 7A:
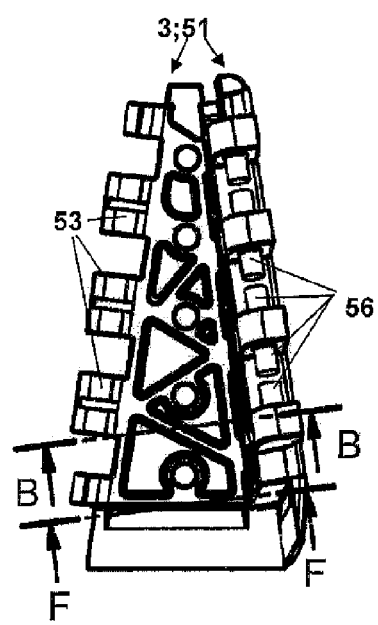
Figure 8A:
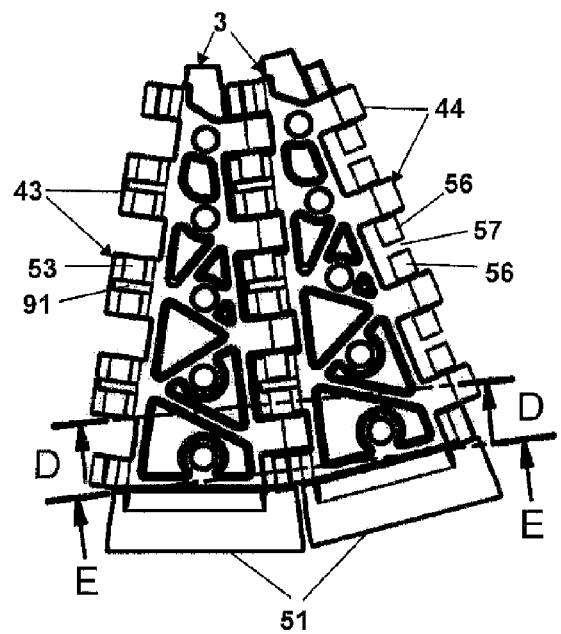

Corresponding assembly for making the connection of two joint partners 51 is shown in FIGS. 6a and 6b through 8a and 8b in three steps. As the first hinge opening 53 is open in the direction of the circle center point axis k the joint partners 51 are moved above each other and brought into engagement in a joining position (FIG. 6) in which the joint partners 51 are positioned at an angle of around 90°, with lateral engagement of the pin 55 into the C-shaped profile of the first hinge opening 53 (see FIG. 7). For easier engagement of the pin 55 into the first hinge opening 53 it is of an enlarged configuration in a funnel-like shape towards the edge of the opening. The joint partners 51 are then pivoted out of the joining position into a working position in which the joint partners are positioned at an angle markedly greater than 90°, here as shown in FIG. 8 at an angle of 180°. To prevent the joint partners 51 detaching from each other again in the working position, there is provided a blocking device 7 which is used here in a duplicate embodiment. In its first embodiment the blocking device has in the first connecting region 41 a blocking projection 71 engaging into a blocking opening 72 provided in the second connecting region 42. The blocking opening 72 is of a laterally opened configuration towards the second side 23 so that the blocking projection 71 can slide unimpededly into the blocking opening 72 upon assembly of the joint partners 51 (FIG. 6c). In the direction from the second side 23 towards the first side 22 however the blocking opening 72 has a lateral wall 73 which opposes movement of the chain link 3 with the blocking projection 71 in that direction and thus serves as an abutment to prevent axial displacement of the joint partner 51 with the first hinge opening 53 in the direction of the surface normal of the first side 22. In that way the two joint partners 51 can admittedly be reciprocated in the working position over a given distance, here over the length 1 of the C-shaped profile, but not beyond same. Accordingly the joint partners 51 can be displaced relative to each other in the translation direction t. This embodiment of the blocking device 7 with blocking projections 71 and blocking opening 72 is provided here in duplicate, more specifically radially inwardly and radially outwardly with respect to the circle center point axis k.

Figure 2:
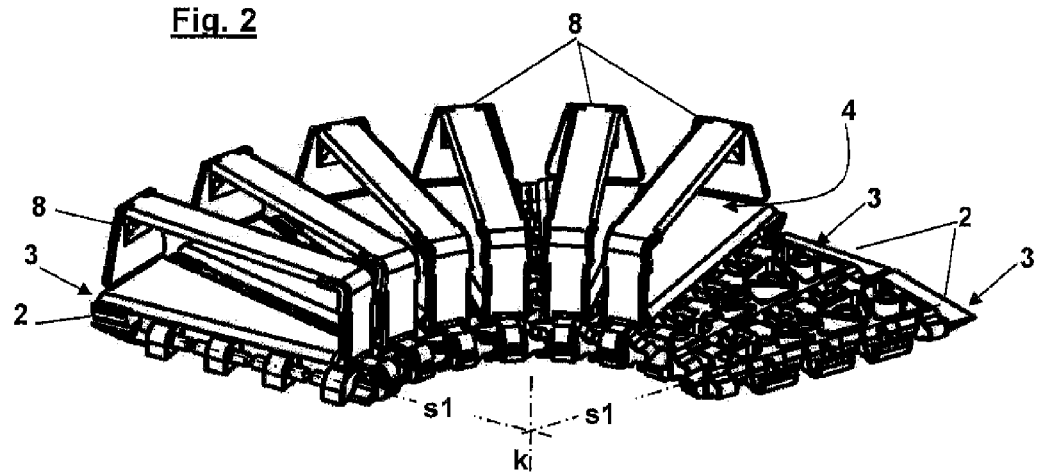
FIG. 2 shows a perspective view of a circular chain portion with a plurality of chain links lying flat as shown in FIG. 1.
Figure 4:
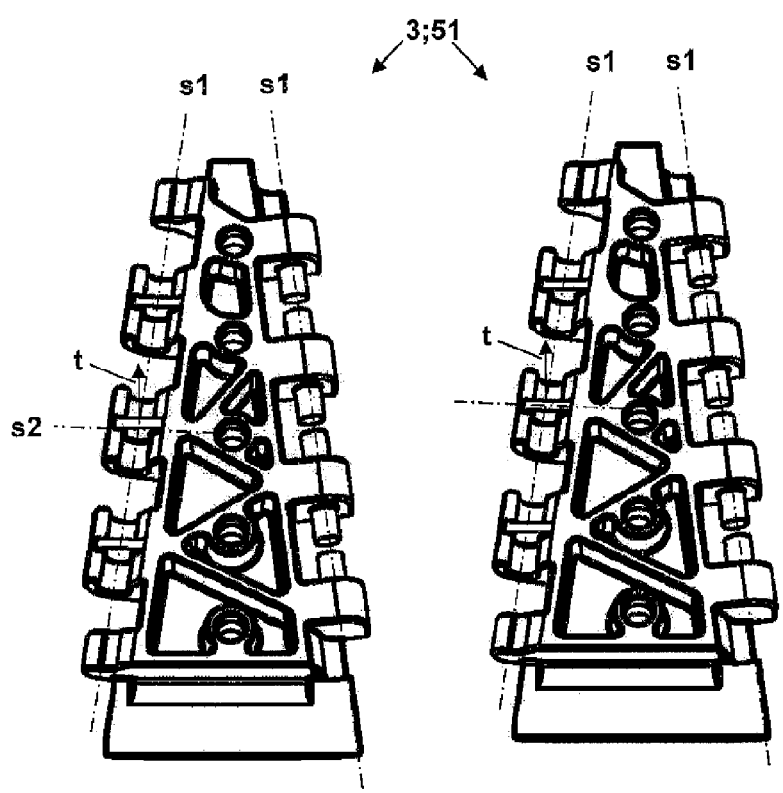
FIG. 4 shows a perspective view of two chain links as shown in FIG. 3 ready for assembly.

As can be seen in particular from FIGS. 1 and 2 provided at the second side here of each chain link 3 is a holding means 8 which is of a loop-shaped configuration axially in the circle center point direction, which after assembly of the joint partners 51 can be fixed on same here in the form of a plug-in connection. If the joint partners 51 connected in the hinge joint connection 5 are moved out of the working position about the first pivot axis s1 back in the direction of the joining position then the holding means 8 arranged at the second side 23 are pivoted relative to each other and can laterally butt against each other when reaching a given pivotal angle. That is shown to some extent in FIG. 1 insofar as holding means 8 of adjacent chain links 3 are pivoted relative to each other when leaving the direction-changing arc 26. Thus a given pivotal angle can be set by way of the dimensioning of the holding means 8 and by way of whether each chain link 3 or each x-th chain link 3, like second or third chain link 3, is provided with the holding means 8, insofar as the holding means 8 laterally butt against each other and thus block further pivotal movement. By virtue of that arrangement a circular chain 1 which is made up in that way can be stored in completely pre-assembled condition, without the risk of the chain links unintentionally becoming detached again.

In order to counteract possible enlargement of the C-shaped profile, that is radial with respect to the first pivot axis s1, under the loading in the circular chain 1, there is provided a reinforcement means 9 which here is in the form of a reinforcement wall 91 arranged perpendicularly to the first pivot axis s. Here the reinforcement wall 91 extends over the entire cross-section of the C-shaped profile and is connected to same. In that way the first hinge opening 53 is divided into here two identical portions. The arrangement of the reinforcement wall 91 requires the pin 55 to be divided in the second connecting region 42 into two pin portions 56. Those two pin portions 56 respectively extend with a free end axially towards each other, with respect to the first pivot axis s1, delimiting an intermediate space 57, wherein the reinforcement wall 91 engages into that intermediate space with engagement of the pin 55 into the first hinge opening 53. The intermediate space 57 is of an axial size with respect to the first pivot axis s1 that is equal to that of the reinforcement wall 91.

Figure 5A:
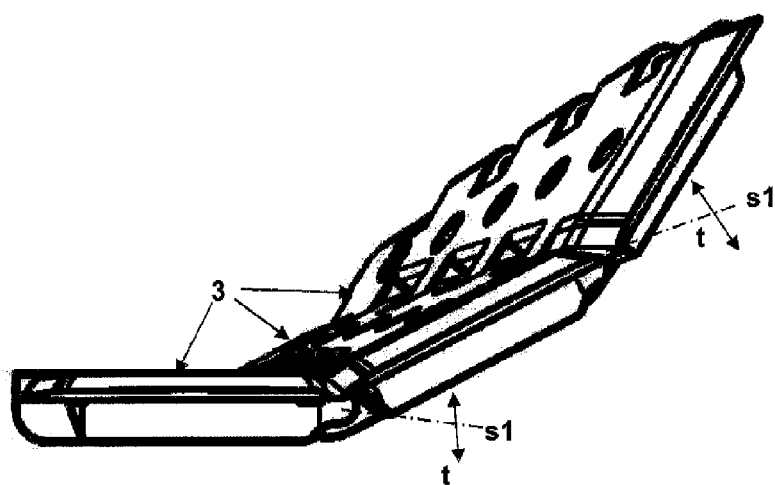
FIGS. 5a through 5c each show a perspective view of three interconnected chain links in different positions relative to each other.
Figure 5B:
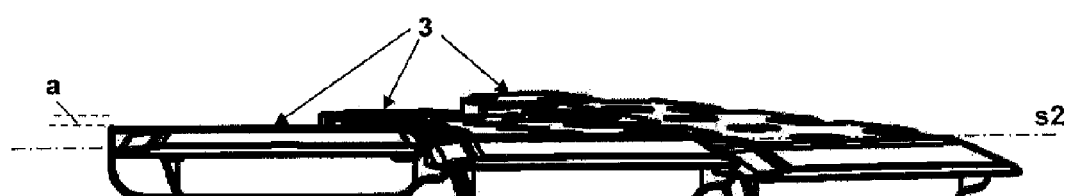
Figure 5C:
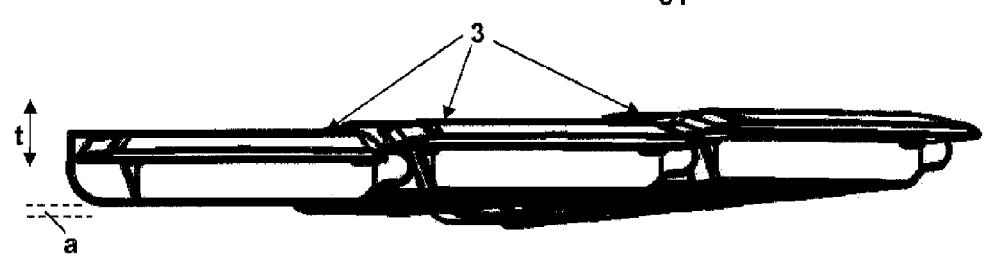
Figure 7C:
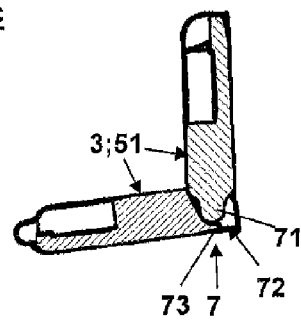

FIGS. 5a through 5c show the possible relative main movements of the joint partners 51 connected by the hinge joint connection 5. As shown in FIG. 5a the here three chain links 3 are pivoted with respect to the respectively associated hinge joint connection 5 about the first pivot axis s1 and in addition displaced relative to each other in the translation direction t in the slot profile of the first hinge opening 53 by a given amount a. That additional translatory movement permits, for example, a tighter radius for the direction-changing arc 56 in the circular chain 1.

Referring to FIG. 5b the joint partners 51 are arranged turned relative to each other about the second pivot axis s2 in the respective hinge joint connection 5. It can easily be seen from FIG. 5b that this successive pivotal movement about the second pivot axis s2 from chain link 3 to chain link 3 can be continued so that, with a suitable number of hingedly interconnected chain links 3, it is possible to set certain maximum pivotal angles of the first chain link relative to the last chain link.

FIG. 5c shows the situation where the three chain links 3 connected by way of the hinge joint connection 5 are displaced relative to each other purely with a translatory movement in the direction of the circle center point axis k by a given amount a so that the chain links 3 are moved into a step-like arrangement. The two additional relative movements of FIGS. 5b and 5c can occur in particular in the transitional region of the runs 24, 25 into the direction-changing arc 26, in a hybrid form.

FIGS. 10 through 13 respectively show a second embodiment of the chain link 3. This embodiment is admittedly of a structurally simpler configuration in comparison with the above-discussed first embodiment, but to provide the hinge joint connection 5 as shown in FIG. 12a it additionally requires a hinge pin 58 as shown in FIG. 11.

In detail, the first hinge openings 53 in the first connecting region 41 are in the form of straight slot openings without a lateral opening. Instead of the pin 55 in accordance with the first embodiment of the chain link 3, provided in the second connecting region 42 as second connecting means 46 are second hinge openings 54 with a circular opening cross-section, wherein the hinge openings 53, 54 of the joint partners 51 producing the hinge connection 5 are arranged in mutually aligned relationship in the connecting position with respect to the first pivot axis s1. Similarly to the first embodiment of the chain link 3 shown in FIGS. 1 through 9 the length l of the slot profile determines the extent of the relative translation of the joint partners 51 in the translation direction t. As indicated in the front second hinge opening 54 shown in FIG. 10 the hinge pin 58 can be screwed at the head end into that second hinge opening 54 and, as shown in FIG. 12a, can be arranged in axially non-displaceable relationship with respect to the first pivot axis s1.

Figure 13A:
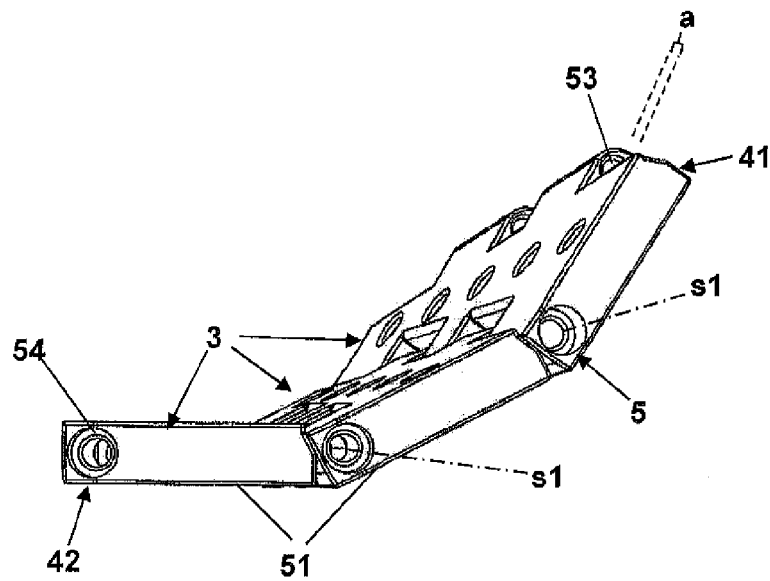
FIGS. 13a through 13d each show a perspective view of three assembled chain links in a given position relative to each other.

Similarly to FIGS. 5a through 5c, FIGS. 13a through 13d also show the fundamental relative forms of movement by means of three interconnected chain links 3. Referring to FIG. 13a all three chain links 3 are pivoted about the first pivot axis s1 and are additionally displaced axially relative to each other in the translation direction t. To limit the pivotal movement about the first pivot axis s1 abutments 59 are provided in the two connecting regions 41, 42.

Figure 13B:
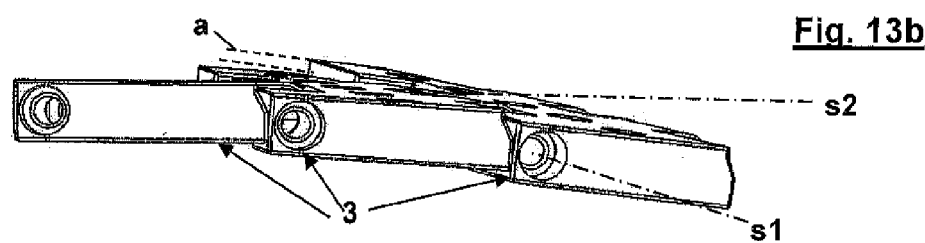
Figure 13C:
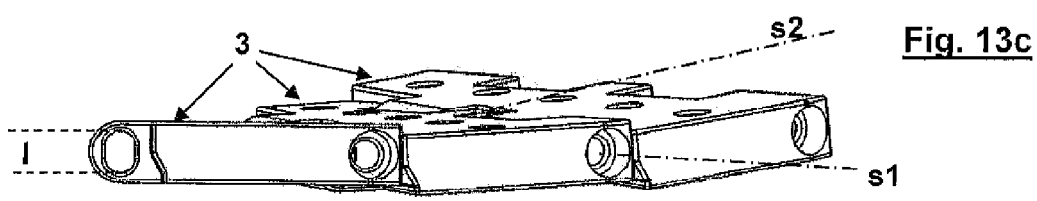
Figure 13D:
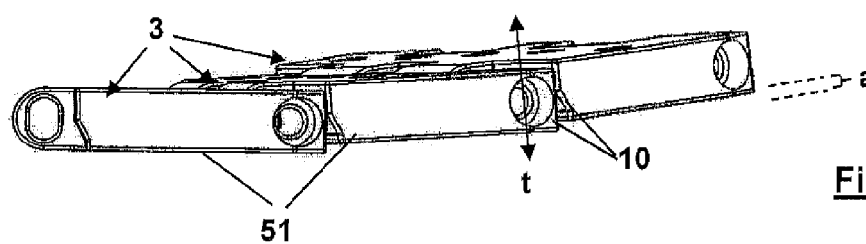

FIG. 13b shows the pivotal movement of the chain links 3 about the second pivot axis s2 perpendicularly to the first pivot axis s1. It can be clearly seen from FIG. 13b that the chain links 3 are tilted by a given amount a relative to each other. FIG. 13c also shows tilting of the chain links 3 relative to each other, the pivotal movement occurring about the second pivot axis s2 here in the reverse direction of rotation to FIG. 13b.

In FIGS. 13a, b and d the three chain links 3 are respectively arranged displaced with respect to the respective joint partner 51 by an amount a relative to each other in the translation direction t.

As can be seen in particular from FIGS. 9b and 13a the connecting regions 41, 42 are provided at their ends with cooperating abutments 10 for delimiting the radius of the direction-changing arc 26 of the circular chain 1.

LIST OF REFERENCES 1 circular chain
2 body
21 belt
22 first side
23 second side
24 first run
25 second run
26 direction-changing arc
27 peripheral narrow side
28 radial narrow side
3 chain link
4 connecting region
41 first connecting region
42 second connecting region
43 first projection
44 second projection
45 first connecting means
46 second connecting means
5 hinge joint connection
51 joint partner
52 sliding guide means
53 first hinge opening
54 second hinge opening
55 pin
56 pin portions
57 intermediate space
58 hinge pin
59 abutment
6 guide space
7 blocking device
71 blocking projection
72 blocking opening
73 wall
8 holding means
9 reinforcement means
91 reinforcement wall
10 abutment
a amount d axis of rotation
k circle center point axis
l length
s1 first pivot axis
s2 second pivot axis
u peripheral direction
t translation direction

What is claimed is:

1. A chain link configured for a circular chain for receiving and guiding energy lines between two connection points which are moveable relative to each other in a circular motion about an axis of rotation (d), wherein the circular chain comprises an arc-shaped body and a center axis (k), the body comprising a plurality of sector-shaped chain links adjoining each other in a peripheral direction (u), wherein adjoining connecting regions of the chain links are respectively pivotably connected together about a first pivot axis (s1) disposed radially outward from the center axis (k), wherein the chain link is configured to form a hinge joint connection with another chain link in which the hinge joint connection comprises respective joint partners, and has at least a first connecting region configured such that the hinge joint connection permits at least one further relative movement of the joint partners relative to each other in addition to pivotal movement about the first pivot axis (s1).

2. The chain link as set forth in claim 1, wherein the further relative movement comprises a first additional relative movement of the joint partners in a form of a pivotal movement of the joint partners about a second pivot axis (s2) in a direction (u) which is peripheral with respect to the center axis (k) and/or a second additional relative movement of the joint partners in a form of a translation of the joint partners transverse to a longitudinal direction (l) and a transverse direction (q) of the joint partners.

3. The chain link as set forth in claim 1, wherein the first connecting region provides a first joint partner of the hinge joint connection, and comprises a sliding guide means to guide a second joint partner of the hinge joint connection.

4. The chain link as set forth in claim 3, wherein the first connecting region has a first hinge opening with a slot profile as the sliding guide means.

5. The chain link as set forth in claim 4, wherein the chain link further comprises a plate-like body having a thickness which is radial with respect to the first pivot axis (s1), wherein the first hinge opening is arranged centrally relative to the radial thickness.

6. The chain link as set forth in claim 4, wherein the chain link further comprises a second connecting region peripherally spaced from the first connecting region with respect to the center axis (k), wherein the second connecting region has a second hinge opening, with an opening profile to receive a hinge pin or a pin for engagement into the first hinge opening of the first joint partner.

7. The chain link as set forth in claim 6, wherein the slot profile of the first hinge opening is of a C-shaped profile for receiving the pin of the second joint partner.

8. The chain link as set forth in claim 7, wherein the chain link has a side arranged transverse relative to the center axis (k) and having means projecting axially therefrom, in particular loop-shaped or arcuate holding means, to receive and guide the energy lines, and the C-shaped profile is arranged to be opened in an axial direction of the projecting means.

9. The chain link as set forth in claim 7, wherein the first hinge opening with the C-shaped profile has a reinforcement means, in particular a reinforcement wall arranged transverse relative to the first pivot axis (s1).

10. The chain link as set forth in claim 1, wherein extending peripherally away from the respective center axis (k) arranged in the first connecting region providing a first joint partner of the hinge joint connection is at least one first projection with a first connecting means and arranged in a second connecting region providing a second joint partner of the hinge joint connection is at least one second projection with a second connecting means.

11. The chain link as set forth in claim 10, wherein provided in the first connecting region are at least two projections in the form of the first projections and provided in the second connecting region are at least three projections in the form of the second projections wherein the projections are arranged in mutually radially adjoining relationship and in an alternate sequence with respect to the center axis (k).

12. A circular chain for receiving and guiding energy lines between two connection points which are moveable relative to each other in a circular motion about an axis of rotation (d), wherein the circular chain has a guide space for the energy lines and comprises an arc-shaped body comprising a plurality of sector-shaped chain links adjoining each other in a peripheral direction (u), wherein adjoining connecting regions of the chain links are respectively pivotably connected together in a hinge joint connection with respective joint partners about a first pivot axis (s1) disposed radially outward from the axis of rotation (d) and wherein the hinge joint connection permits at least one further relative movement of the joint partners relative to each other in addition to the pivotal movement about the first pivot axis (s1).

13. The circular chain as set forth in claim 12, wherein the further relative movement of the joint partners comprises a first additional relative movement of the joint partners in a form of a pivotal movement of the joint partners about a second pivot axis (s2) in a direction which is peripheral with respect to the axis of rotation (d) and/or a second additional relative movement of the joint partners in a form of a translation of the joint partners transverse to a longitudinal direction (1) and a transverse direction (q) of the joint partners.

14. The circular chain as set forth in claim 12, wherein the chain links have a first connecting region and a second connecting region peripherally spaced from the first connecting region with respect to the axis of rotation (d), wherein adjacent chain links are respectively connected together by way of a first and a second connecting region.

15. The circular chain as set forth in claim 14, wherein the first connecting region has first connecting mean and the second connecting region has second connecting means, and wherein the respective connecting means are arranged in or at a projection which extends peripherally or tangentially relative to the axis of rotation (d) away from the respective connecting region, wherein the respective projections are arranged to engage tooth-like into each other and are arranged to bear against each other laterally.

16. The circular chain as set forth in claim 14, wherein the first connecting region has a first hinge opening which is radial with respect to the axis of rotation (d) and having a slot profile and the second connecting region has a second hinge opening, wherein adjacent chain links in a connecting position are arranged to be brought together in such that the first hinge opening is arranged in axially aligned relationship with respect to the first pivot axis (s1) in relation to the second hinge opening and are held pivotably relative to each other by a hinge pin arranged to be passed through the hinge openings.

17. The circular chain as set forth in claim 14, wherein the first connecting region has a first hinge opening with a slot profile, and the second connecting region has at least one pin.

* * * * *